(12) United States Patent
Fröschle

(10) Patent No.: US 7,850,223 B2
(45) Date of Patent: Dec. 14, 2010

(54) FOLDING TOP WITH A TOP CLOTH WHICH IS CONNECTED TO A FRAME LINK

(75) Inventor: Mathias Fröschle, Ostfildern (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 380 days.

(21) Appl. No.: 11/852,403

(22) Filed: Sep. 10, 2007

(65) Prior Publication Data

US 2008/0061581 A1    Mar. 13, 2008

(30) Foreign Application Priority Data

Sep. 8, 2006   (DE) ........................ 10 2006 042 288

(51) Int. Cl.
*B60J 7/00*    (2006.01)
(52) U.S. Cl. .............................. 296/107.11; 296/107.09
(58) Field of Classification Search ............ 296/107.11, 296/121, 107.09
See application file for complete search history.

(56) References Cited

U.S. PATENT DOCUMENTS

| | | | | |
|---|---|---|---|---|
| 5,100,195 A | * | 3/1992 | Patel | 296/107.11 |
| 5,669,656 A | | 9/1997 | Aydt et al. | |
| 5,829,821 A | | 11/1998 | Aydt et al. | |
| 6,523,881 B1 | * | 2/2003 | Langguth | 296/107.12 |
| 2004/0094988 A1 | * | 5/2004 | Doncov et al. | 296/107.11 |

FOREIGN PATENT DOCUMENTS

| | | |
|---|---|---|
| DE | 4038694 A1 | 6/1992 |
| DE | 4441666 C1 | 12/1995 |
| EP | 0713794 B1 | 5/1996 |

* cited by examiner

*Primary Examiner*—Joseph D Pape

(57) ABSTRACT

A folding top for a vehicle comprises a roof frame which comprises at least one front frame part and one rear frame part, a top cloth and a frame link, which is coupled kinematically to the roof frame, for moving the roof frame from a storage position, in which the top is put away in a receiving space, into a closed position, in which the top spans a passenger compartment. The top cloth is at least partially connected laterally to the frame link.

8 Claims, 3 Drawing Sheets

FOLDING TOP WITH A TOP CLOTH WHICH IS CONNECTED TO A FRAME LINK

CROSS-REFERENCE TO RELATED APPLICATION

This application claims the priority, under 35 U.S.C. §119, of German application DE 10 2006 042 288.0, filed Sep. 8, 2006; the prior application is herewith incorporated by reference in its entirety.

BACKGROUND OF THE INVENTION

Field of the Invention

The present invention relates to a folding top for a vehicle, in particular to passenger vehicle, i.e., a convertible. The folding top of the generic type has a roof frame with at least one front frame part and one rear frame part, a top cloth and a frame link, which is coupled kinematically to the roof frame, for moving the roof frame from a storage position, in which the top is stowed in a receiving space, into a closed position, in which the top spans a passenger compartment.

In addition to a top cloth, which can be of single or multi-layered design and preferably has at least one roof lining facing the passenger compartment and a weatherproof outer layer, a folding top of the type in question comprises a multi-part roof frame which, in a closed position of the top, at least partially bears against edges of the closed side windows and/or doors of the vehicle and/or against the upper edge of the windshield frame. If, in the case of a vehicle embodied as a roadster, there are no side windows and no door edges protruding above the belt line, the roof frame forms the lateral end of the top.

In order to move the folding top from a storage position, in which it is put away in a receiving space, into the closed position, in which the top spans a passenger compartment, the roof frame is composed of a plurality of frame parts which are movable in relation to one another and, in the closed position, essentially form the front border and the side borders of the top and, in the storage position, are put away, folded in relation to one another, in a top compartment or in the rear of the vehicle.

In order to produce this movement, a folding top of the type in question furthermore comprises at least one frame link. The latter is connected directly or via further frame, intermediate or transverse links to one of the frame parts in an articulated manner such that said frame part is moved in a positively guided manner at the same time as a movement of the frame link. By this means, it is advantageously possible to kinematically couple the movement of a plurality of frame parts to one another, and therefore, during the movement of one frame part, further frame parts move at the same time along predetermined paths. In this case, not all of the frame parts have to be moved individually, which simplifies the spreading out and folding in of the top. Equally, it is possible not to actuate certain frame parts directly, but rather via the frame link and thus to move them indirectly, for example by motor via an actuator arranged in the vehicle.

In the closed position, the top cloth is to be sealed in relation to the roof frame. In particular if the roof frame, for its part, is sealed in relation to the upper edge of the windshield frame and the upper edges of the door frames and/or of the closed windows, the entire passenger interior is therefore sealed such that the occupants are protected against rain, relative wind and the like. Even in the case of a classic roadster without side windows, the top cloth is to be sealed in relation to the roof frame in order to prevent rain or relative wind from penetrating between top cloth and the roof frame, which forms the lateral end of the top.

The closest solution in this respect, as used, for example, in the current BMW Z4 convertible and described in German published patent application DE 40 38 694, involves connecting the top cloth directly to the roof frame. This ensures the greatest possible seal tightness in the closed position.

However, that solution disadvantageously severely restricts both the kinematics of the roof frame and the folding of the top cloth. The folding of the top cloth when being put away in the storage position is thus predetermined by the movements, which take place in this connection, of the individual frame parts to which the top cloth is connected. In particular, the final position of the individual frame parts relative to one another and to the vehicle determines the topology in which the top cloth is folded in the storage position.

At the same time, a connection of the top cloth to two adjacent frame parts prevents, at any rate within the scope of the elongation limits of the top cloth, a translatory displacement of said parts away from each other and thus only permits simple top kinematics, in which adjacent roof frame parts rotate relative to one another only in common articulation points. In particular, a top kinematics cannot be realized, in which a frame part essentially maintains its orientation during spreading out and folding in by being moved, for example, via a four-bar mechanism.

To produce different top kinematics, it is therefore known, for example, from German patent No. DE 44 41 666 C1 (cf. U.S. Pat. No. 5,829,821) or European published patent application EP 0 713 794 A1 (cf. U.S. Pat. No. 5,669,656) and used in the current Porsche Boxster 986/987, not to connect the top cloth to the rear roof frame part, which forms the B pillar, but rather, to insert the lateral border of the top cloth only during the closing operation into a receptacle formed in the frame part. For this purpose, the top cloth is connected fixedly to a front frame part, which is designed as a dimensionally stable top section, and to a main bow. During closing of the top, the front and rear roof frame parts and the main bow, which runs transversely with respect thereto, move in relation to one another and thereby stretch the top cloth, as a result of which the border of the latter is introduced into the receptacle in the rear roof frame part. Upon complete closing, a cable incorporated in the border of the top cloth then stretches the top cloth and secures the latter to the rear frame part.

The top cloth is therefore only connected frictionally via the bracing of the cable in the receptacle to the rear roof frame part, which is designed as the B pillar, which, in particular at relatively high wind forces or other loadings on the top, may result in minimal movements of the top cloth relative to the rear frame part and therefore to a deterioration in the sealing action, to an increase in the traveling noises and to wearing of the top cloth border.

Furthermore, even in this solution of the top kinematics and of the folding, tight limits are imposed. The folding of the top cloth as it is being put away into the storage position is thus predetermined by the relative movement, taking place in this connection, of the main bow against the front roof frame part. In particular, the storage position of the main bow decisively determines the topology in which the top cloth is folded in the storage position.

Accordingly, this solution necessarily requires a main bow in order to adequately guide the top cloth in the region of the rear roof frame part and, in particular, to prevent rotation or jamming, for example in links, top compartment or roof frame parts, during the folding operation. This additionally restricts the freedom of design of the folding top.

SUMMARY OF THE INVENTION

It is accordingly an object of the invention to provide a folding top for a vehicle which overcomes the above-mentioned disadvantages of the heretofore-known devices and methods of this general type and which permits more advantageous folding of the top cloth into or in the storage position.

With the foregoing and other objects in view there is provided, in accordance with the invention, a folding top for a vehicle, in particular a passenger vehicle, comprising:

a roof frame including at least one front frame part and one rear frame part;

a frame link kinematically coupled to said roof frame, for moving said roof frame from a storage position, in which the top is stowed in a receiving space, into a closed position, in which the top spans a passenger compartment of the vehicle;

a top cloth at least partially connected laterally to said frame link.

A folding top according to the invention for a vehicle, in particular a passenger vehicle, comprises a multi-part roof frame with a front and a rear frame part. As emerges from the explanations in the introduction, a roof frame is understood in a conventional manner in the art as meaning, in particular, those components which, in the closed position, at least partially bear against edges of the closed side windows and/or doors of the vehicle and/or against the upper edge of the windshield frame.

Furthermore, a folding top according to the invention comprises a top cloth. The latter can preferably be connected to the front frame part such that, by the transfer of said frame part into its closed position, said top cloth is pulled forwards in the direction of the vehicle to the upper edge of the windshield frame and is advantageously stretched. At its rear edge, the top cloth can be fastened directly to the vehicle such that it is stretched into its envisaged shape by means of the movement of the roof frame into its closed position, in particular by means of the front frame part and, if appropriate, extending main and/or intermediate bows. Equally, the rear edge of the top cloth can be connected to a clamping bow which is lowered during the transfer into the closed position and thus stretches the top cloth.

Furthermore, a folding top according to the invention comprises at least one frame link for moving the roof frame from the storage position, in which the top is put away in a receiving space, into the closed position, in which the top spans a passenger compartment. This may involve a main link which is coupled to a front or central frame part of the roof frame and to a top bearing in the vehicle body and transfers said frame part into its final position in a positively controlled manner during closing of the top. Equally, this may involve an intermediate or transverse link which is coupled between a frame part and a further link, preferably a main link, and thus controls the movement of the frame part.

According to the invention, the top cloth is now at least partially connected laterally to said frame link. The folding of the top cloth into or in the storage position is therefore defined by the movement and the final position of said frame link. The kinematics of the frame link can advantageously therefore be predetermined in such a manner that desired folding of the top cloth follows, since the top cloth in its storage position, in its closed position and during the movement between these two positions is guided laterally by the frame link. If, for example, the frame link is folded up in the storage position, the top cloth is also correspondingly folded. If the frame link is located in its storage position below or above the folded up roof frame, then the top cloth is also located correspondingly lower down or higher up, which advantageously permits better utilization of a receiving space for the top. In addition, jamming of the top cloth between frame parts, other frame links and/or the vehicle can be avoided by appropriate selection of the kinematics of the top link. For example, the frame link can be guided in such a manner that the top cloth only sags a little, if at all, during some of its movement or over the entire movement between the closed and storage positions.

At the same time, the kinematics of the roof frame, in particular the movement of the individual frame parts in relation to one another, can be designed substantially more freely. In contrast to the prior art explained at the beginning, in which the top cloth is connected to all of the frame parts, adjacent frame parts can thus also be moved in a translatory manner in relation to one another. In particular, individual frame parts can be moved into their closed and/or storage position in such a manner that they essentially maintain their orientation, i.e. their inclination in relation to the longitudinal axis of the vehicle. For this purpose, frame parts of this type can be coupled, for example, via a four-bar mechanism.

Furthermore, the connection to the frame link permits freer shaping of individual frame parts, since the top cloth is not connected to all of the frame parts and its lateral border is no longer defined by them.

It is also possible, in the case of a top according to the invention, to provide a main bow to which the top cloth, in a preferred development, can be additionally fastened. However, in contrast to the prior art explained at the beginning, such a connection to a main bow is not necessary—and advantageously the main bow itself may even be omitted.

The top cloth can be securely fixed at corresponding sections of its longitudinal border by its connection to the frame link. In contrast to the introduction, explained at the beginning, into and bracing in a receptacle in the rear frame part, according to the invention the top cloth can also be fastened to the frame link in the same manner as to a frame part, for example by screws, rivets, adhesive bonding, by means of clamping elements and/or by introduction into undercut guide grooves. This can reduce micromovements of the top cloth border in relation to its fastening and thus improve the seal tightness of the top, reduce the driving noises, in particular the wind noises, and increase the service life of the top cloth.

In a preferred embodiment, the lateral border of the top cloth is tightly connected at least in some sections to the frame link. For this purpose, in a particularly preferred embodiment, the top cloth is connected to the frame link essentially over the entire length thereof.

The roof frame advantageously forms that border of the top which is at least partially visible in the closed position, while the frame link or the frame links are only partially visible, if at all, from the passenger compartment and/or the outside of the vehicle. In contrast to the roof frame, the frame links can therefore be designed in a purely functional manner without taking esthetic, aerodynamic or similar criteria into consideration.

In a particularly preferred embodiment, the roof frame comprises, in addition to the front and rear frame parts, at least one central frame part which, in the closed position, is arranged between the front and rear frame parts. By means of the more diverse kinematic possibilities which arise by the connection of the top cloth to a frame link, in particular three- or multi-section tops of this type can advantageously be realized, and they therefore constitute a particularly advantageous application of the present invention.

For example, the front and/or the central frame part can be transferred from the storage position into the closed position essentially while maintaining their orientation with respect to the longitudinal axis of the vehicle, while a rear frame part pivots here about a top bearing of the vehicle body. For this purpose, the front and the central frame parts can be advantageously connected via a four-bar mechanism which can be actuated by the rear frame part or a main link. The main link can equally also be coupled to the central or rear frame part and can control the movement thereof in relation to the vehicle. In this embodiment of the present invention, the top cloth is connected laterally to the main link.

In the closed position, the frame parts preferably form a continuous top border which can be composed, in particular, of two B or C pillars, a front top edge, which can be connected releasably to the upper edge of the windshield frame, and, preferably, additionally of two lateral top borders. In this case, a rear frame part forms a B or C pillar.

In a preferred embodiment, mutually opposite frame parts can be connected to each other by bows. Equally, such opposite frame parts can also be connected to each other in a sheet-like manner and thus form dimensionally stable top sections. Both embodiments can also be combined with each other, and therefore, for example, two front lateral frame parts together with a roof panel formed integrally with them form a dimensionally stable front top section while transverse bows connect central and/or rear lateral frame parts in each case to one another.

In the closed position, the frame link advantageously at least partially bears against the rear frame part and is preferably at least partially accommodated in a corresponding recess of the frame part. A compact top shape can thereby be produced. In addition, it is possible to conceal the frame link to a greater or lesser extent between top cloth and roof frame.

In particular for this purpose, in the closed position, the frame link can entirely or partially cover the rear frame part from the outside. If it completely covers the frame part, a harmonious closed transition arises in side view between a side window and/or a door border and the top, which transition is advantageous for aerodynamic reasons. In addition here, a seal can act directly between a top cloth and a side window or a window seal, and therefore only one seal is exposed to the outside. This advantageously increases the seal tightness of the closed vehicle.

On the other hand, in the closed position, a region of the frame part can also remain visible from the outside. This not only gives the vehicle a striking appearance but, in addition, can improve the sealing situation by seals between the roof frame and the side window, on the one hand, and the top cloth, on the other hand, each making contact with the roof frame itself, i.e. the seal of the top cloth does not interact with the window seal. This is because, with such a consecutive connection of window seal and top cloth seal interacting therewith, the overall rigidity, the compression and therefore the sealing action of the sealing assembly are reduced.

The top cloth, for its part, can entirely or partially cover the frame link from the outside and can be fastened thereto in any manner already known for connection to frame parts.

In a preferred embodiment, on one frame part or the frame link a first seal, directed towards the other of said frame part and the frame link, is arranged in such a manner that, in the closed position of said frame part, said seal forms a seal against the frame link and, for this purpose, advantageously comes into contact with the other of said frame part and the frame link. The top is then tight overall in the closed position, since the top cloth is tightly connected to the frame link and the latter, in turn, is sealed off from the frame part.

In an advantageous development of this embodiment, a second seal is arranged on the frame part or the frame link in such a manner that, in the closed position, it interacts in a sealing manner with a window seal of a side window of the vehicle. The window seal, for its part, can advantageously be arranged on the frame part and seals the latter off from the side window of the vehicle. When the top is closed, the window seal then prevents water from penetrating between side window and roof frame, the first seal prevents water from penetrating between roof frame and frame link, and the second seal prevents water from penetrating between top cloth and roof frame. Even if the side window is at least partially open and therefore the window seal is relaxed, the first seal still reliably provides a seal against water penetrating between roof frame and frame link.

Even without the second seal, the first seal has the further advantage of damping the placing of the frame link against the frame part and, when the frame link has been placed, of compensating for relatively small relative movements which arise because of the dynamics of the vehicle.

If the frame link does not completely engage around the rear frame part, i.e. a region of the frame part remains visible from the outside even in the closed position, instead of acting between top cloth and window seal the second seal can also act between top cloth and roof frame. This advantageously increases the sealing action, since now, firstly, water or relative wind is prevented from penetrating between top cloth and roof frame and, secondly, is prevented from penetrating between the frame link, which is tightly connected to the top cloth, and the roof frame.

In a further preferred embodiment, the window seal of the side window itself is designed with a sealing lip which, in the closed position, interacts in a sealing manner with the top cloth which is connected to the frame link. This advantageously reduces the number of parts and, furthermore, realizes the same advantages as have been described above.

The frame link, which is designed as a main link, is advantageously actuated by motor. For this purpose, it can be moved, for example via hydraulic cylinder, electric motors, boden cables or the like, in its points of articulation with which it is coupled to the vehicle or the frame part. The present invention can advantageously be used particularly in the case of such (partially) automated opening and closing of the top, in which the folding of the top cloth is not corrected manually. This applies particularly if the top is a three- or multi-section top, i.e. a top which has at least one central frame part in addition to a front and a rear frame part. In the case of tops of this type, the movement of the various frame parts is preferably controlled by a plurality of frame links, and therefore the risk of the top cloth jamming is particularly great.

Other features which are considered as characteristic for the invention are set forth in the appended claims.

Although the invention is illustrated and described herein as embodied in folding top with a top cloth which is connected to a frame link, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
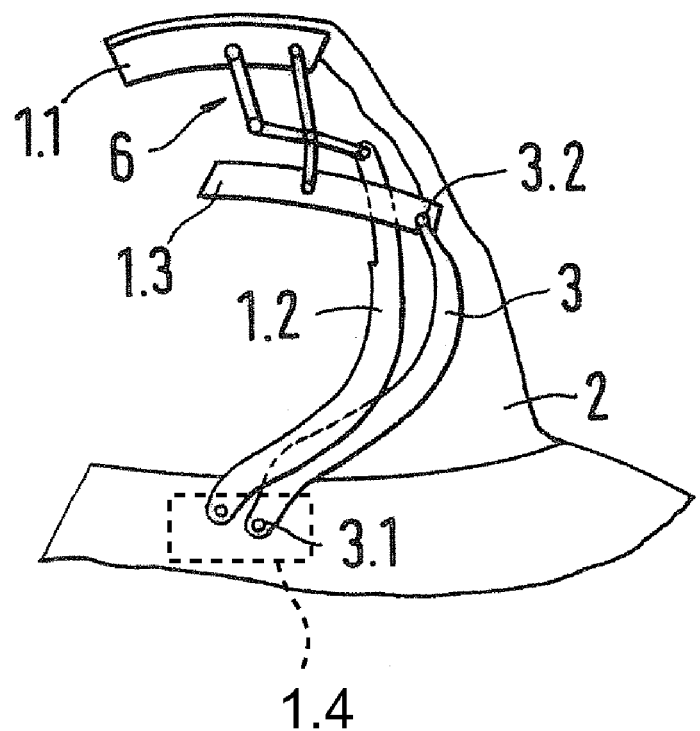
FIG. 1 shows a schematic diagram of a top according to one embodiment of the present invention during the closing operation, in a half section from the interior of the vehicle.

Referring now to the figures of the drawing in detail and first, particularly, to FIG. 1 thereof, there is shown a schematic of a three-section top according to one embodiment of the present invention during the closing operation. It comprises a front frame part 1.1 which is connected to a central frame part 1.3 via a four-bar mechanism 6. A rear frame part 1.2, which forms the B pillar of the vehicle, reaches through a longitudinal slot in the central frame part 1.3 and is thereby positively controlled. The rear frame part 1.2 is coupled rotatably at its one end to a top bearing 1.4 of the vehicle and, at its other end, to a transverse link of the four-bar mechanism 6. The three frame parts 1.1-1.3 together form the roof frame 1 which can be seen in FIG. 2.

A main link 3 is coupled at its one end 3.1 ("first end") rotatably to the top bearing 1.4 of the vehicle and is coupled rotatably at its other end 3.2 ("second end") to the central frame part 1.3 and, by means of a hydraulic cylinder (not illustrated), in the top bearing is rotated about an axis parallel to the transverse axis of the vehicle.

Figure 2:
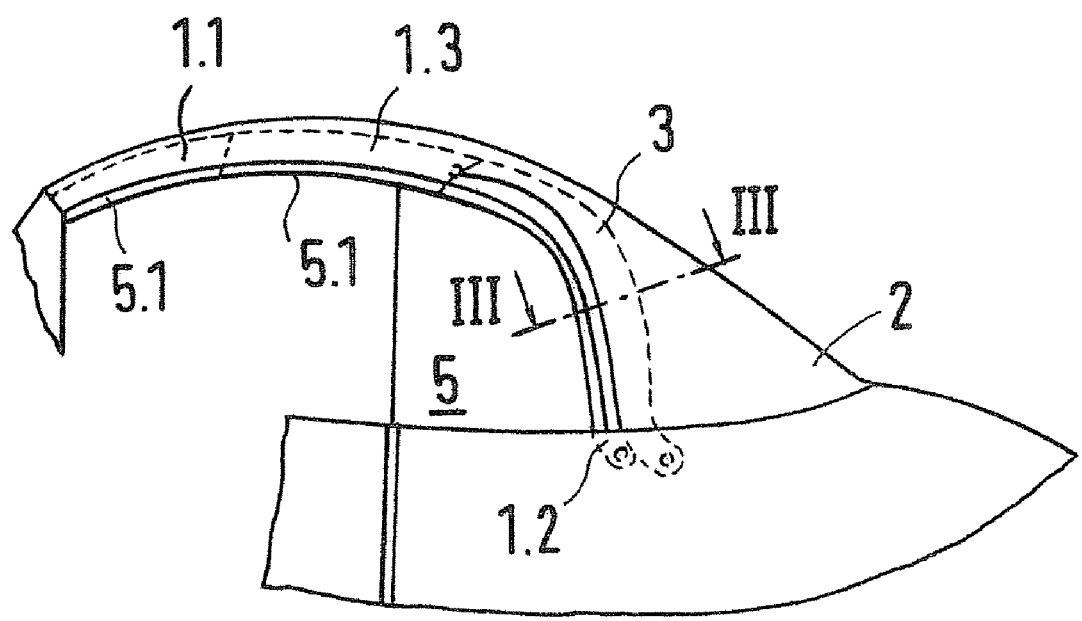
FIG. 2 shows the top according to FIG. 1 in a lateral external view in the closed position.

The main link 3 rotates here from a storage position (not illustrated), in which it is put away in a top receptacle of the vehicle, via the position shown in FIG. 1 into the closed position according to FIG. 2 and, in the process, guides the central frame part 1.3, the orientation thereof with respect to the longitudinal axis of the vehicle, i.e. its horizontal position, essentially being maintained. This, for its part, enforces a corresponding rotation of the rear frame part 1.2 which is guided in the slot and, for its part, moves the four-bar mechanism 6 in such a manner that the front frame part 1.1 is moved from the storage position into the closed position (illustrated in FIG. 2) essentially while maintaining its orientation with respect to the longitudinal axis of the vehicle.

Figure 3:
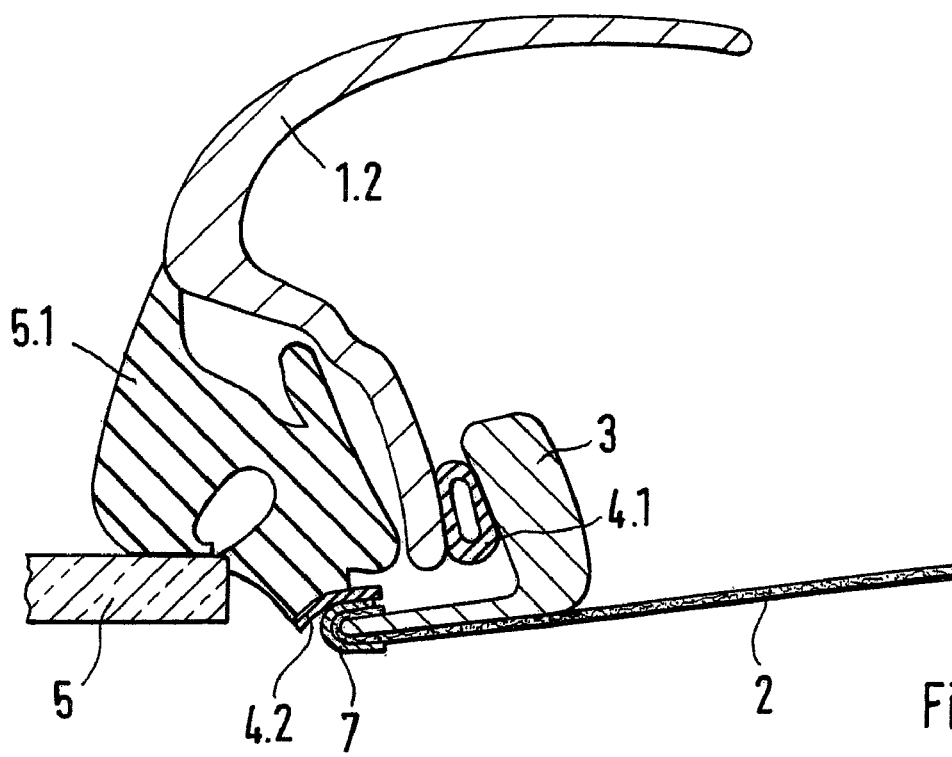
FIG. 3 shows a section along the line III-III in FIG. 2.
Figure 4:
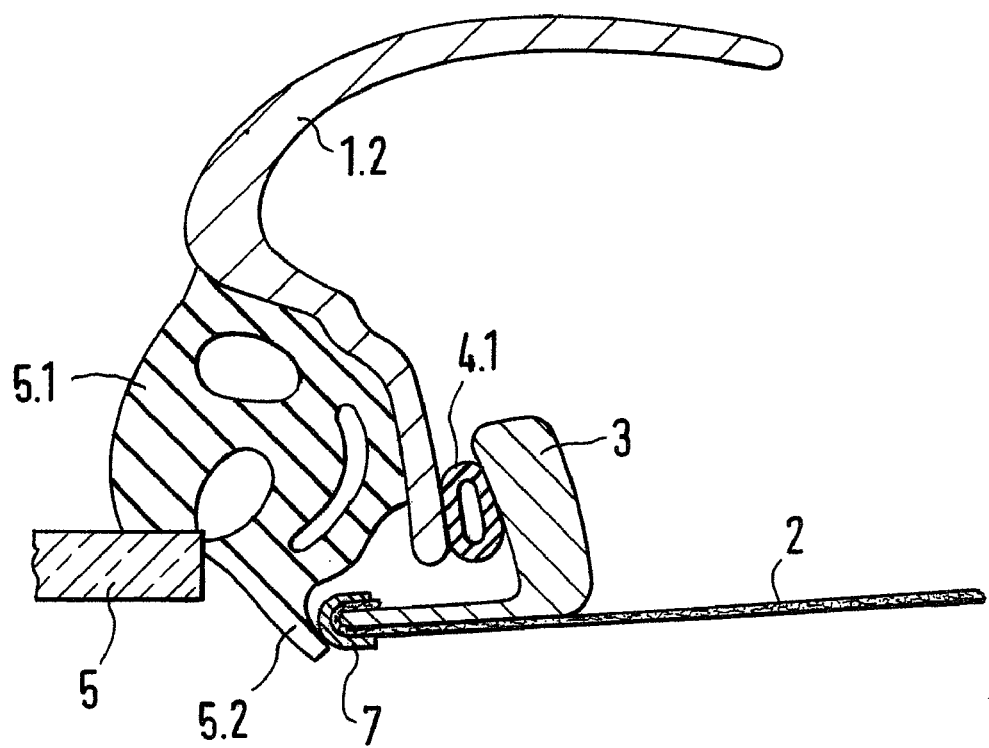
FIG. 4 shows a section corresponding to FIG. 3 of a further embodiment of the present invention.

As indicated in FIG. 2, in the closed position the main link 3 partially engages in a corresponding recess in the rear frame part 1.2, bears against the latter and partially engages over it from the outside of the vehicle, as is apparent in particular from FIGS. 3, 4.

The top cloth is firstly connected to the front frame part 1.1, which is of sheet-like design and, by means of the transfer thereof into the closed position, is stretched. For this purpose, it is connected at the rear end in a manner which is not shown specifically in the top receiving space of the vehicle.

As shown in FIGS. 3, 4, the border of the top cloth is also connected to the main link 3. For this purpose, a clamping element 7 engages around the top border and the link border and connects the two frictionally to each other. The top cloth 2 completely covers the main link 3 as seen from the outside (from the bottom in FIGS. 3, 4).

The top cloth is therefore spread out and folded in by the movement of the front frame part 1.1 and of the main link 3 in relation to each other and with respect to the vehicle. As is apparent in particular in FIG. 1, the frame parts 1.2, 1.3 can carry out freer movements without being obstructed therein by the top cloth. In particular, the rear frame part does not have to be retracted deeply into the top receiving space in order to put away the top cloth to a corresponding depth. On the other hand, the connection to the main link and the engaging thereof from the rear in the rear frame part ensure that the top cloth is not jammed between frame parts or twisted during folding.

The top cloth can be pressed from the outside against the central frame part 1.3, with adequate fixing being obtained by the double-sided connection to the front frame part 1.1 on the one side and to the main link 3 on the other side. Equally, the top cloth border can be introduced during closing in a manner known per se into a corresponding receptacle in the central frame part and can be braced there, for example by means of a cable incorporated into the border. Since, however, the top cloth is connected on both sides to the front frame part and main link, there is nevertheless secure fixing to the central frame part 1.3 too.

As indicated in FIG. 2 and as can be seen more clearly in FIGS. 3, 4, a closed side window 5 partially engages over a window seal 5.1 which is arranged on the rear roof frame 1.2 in a manner not illustrated specifically. For example, the window seal can be introduced into a corresponding recess in the frame part and/or can be adhesively bonded thereto.

In the embodiment illustrated in FIG. 3, a first seal or sealing element 4.1 is fastened to the main link 3 in a manner not illustrated specifically. For example, it can engage by means of a projection in a corresponding recess and/or can be adhesively bonded to the main link.

In the closed position, this first seal 4.1 makes contact with the rear frame part 1.2. This firstly advantageously prevents water or relative wind from penetrating between roof frame and main link. Secondly, the first seal also damps the impact of the main link against the rear frame part and thus reduces the closing noise. Furthermore, in the closed position, it compensates for small relative movements between roof frame 1 and main link 3, and thus reduces the noises of the top and increases the service life of the components.

Furthermore, in the embodiment according to FIG. 3, a second seal 4.2 is arranged on that side of the main link 3 which faces the vehicle interior in such a manner that, in the closed position, it interacts with the window seal 5.1 and thus prevents water or relative wind from penetrating between top cloth and roof frame. By connecting first and second seal consecutively, the sealing action is firstly reinforced. Secondly, the two seals can each be designed to be smaller and in this respect to be less obtrusive.

In an alternative embodiment according to FIG. 4, instead of the second seal 4.2 the window seal 5.1 is designed with a sealing lip 5.2 which, in the closed position, makes contact with the top cloth 2, which is connected to the main link 3, and thus seals off top cloth and window pane from each other. In comparison to the embodiment according to FIG. 3, an additional second seal is therefore omitted, which advantageously reduces the number of parts and therefore the outlay on installation.

Figure 5:
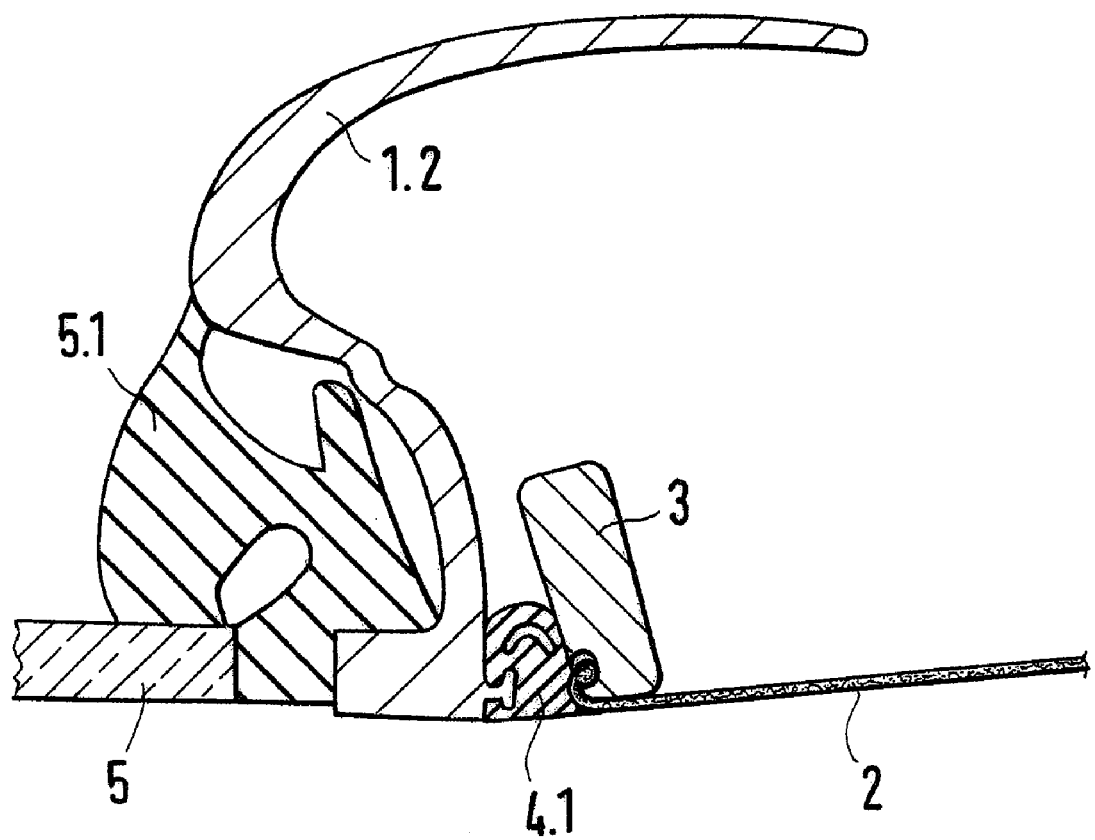
FIG. 5 shows a section corresponding to FIGS. 3 and 4 of a further embodiment of the present invention.

FIG. 5 shows a further embodiment of the present invention, in which the main link 3 only partially engages over the rear frame part 1.2, and therefore a region of the rear frame part remains visible from the outside even when the top is closed. As in the preceding embodiments, a window seal 5.1 is arranged on one side of the frame part 1.2 and interacts in a sealing manner with the closed side window 5. On the opposite side of the frame part 1.2, a first seal 4.1 is fastened on a projection of the frame part. The main link 3, to which the top cloth 2 in the embodiment illustrated here is connected by means of a weather strip inserted into an undercut groove, interacts with said first seal in the closed position.

Each seal 4.1, 5.1 therefore advantageously acts between two rigid bodies, which advantageously avoids a series connection of seal rigidities and therefore a lower compression and sealing action.

The invention claimed is:

1. A folding top for a vehicle, comprising:
    a roof frame including at least one front frame part, at least one rear frame part and at least one central frame part;
    a frame link kinematically coupled to said roof frame, for moving said roof frame from a storage position, in which the top is stowed in a receiving space, into a closed position, in which the top spans a passenger compartment of the vehicle;
    said frame link including a first end articulated on the vehicle and a second end articulated on said at least one central frame part;
    a four-bar mechanism connecting together said at least one front frame part and said at least one center frame part;
    a top cloth at least partially connected laterally to said frame link and to said at least one front frame part;
    said top cloth not being permanently fixed to said at least one central frame part, but rather, being pressed thereon from the outside;
    in the closed position of the roof frame, said frame link at least partially bearing against said at least one rear frame part and said at least one central frame part being disposed between said at least one front frame part and said at least one rear frame part; and
    during a movement of said roof frame from the storage position into the closed position, said at least one front frame part substantially maintaining an orientation thereof.

2. The folding top according to claim 1, wherein the folding top is mounted to cover a passenger compartment of a convertible passenger vehicle.

3. The folding top according to claim 1, wherein said at least one rear frame part forms a B pillar of the vehicle.

4. The folding top according to claim 1, wherein said first end of said frame link is articulated on a convertible top bearing of the vehicle.

5. The folding top according to claim 1, wherein, in the closed position of the top, said frame link entirely or partially covers said at least one rear frame part from the outside.

6. The folding top according to claim 1, which comprises a sealing element disposed on said roof frame or said frame link and directed towards the other of said roof frame and said frame link, said sealing element, in the closed position of said roof, forming a seal against said frame link.

7. The folding top according to claim 1, which comprises a sealing element disposed on at least one of said at least one central frame part, said at least one front frame, said at least one rear frame part and said frame link, said sealing element, in the closed position, interacts in a sealing manner with a window seal of a side window of the vehicle.

8. The folding top according to claim 1, wherein a window seal of a side window of the vehicle is formed with a sealing lip which, in the closed position of the top, interacts to form a seal with said top cloth connected to said frame link.

* * * * *